United States Patent
Yasuhara et al.

(10) Patent No.: US 7,614,684 B2
(45) Date of Patent: Nov. 10, 2009

(54) VEHICLE BODY FLOOR STRUCTURE

(75) Inventors: Shigeto Yasuhara, Wako (JP); Shinya Takei, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/279,015

(22) PCT Filed: Feb. 7, 2007

(86) PCT No.: PCT/JP2007/052539

§ 371 (c)(1),
(2), (4) Date: Aug. 11, 2008

(87) PCT Pub. No.: WO2007/094328

PCT Pub. Date: Aug. 23, 2007

(65) Prior Publication Data

US 2009/0001761 A1 Jan. 1, 2009

(30) Foreign Application Priority Data

Feb. 13, 2006 (JP) .............................. 2006-035825

(51) Int. Cl.
*B62D 25/20* (2006.01)
*B60K 15/063* (2006.01)
(52) U.S. Cl. ............................ 296/187.09; 296/193.07; 296/193.09; 296/209; 180/69.4
(58) Field of Classification Search .............. 296/187.09, 296/187.1, 193.07, 193.09, 198, 203.02, 296/209; 280/783, 784, 796, 797, 798, 800; 180/69.4, 69.1, 69.5
See application file for complete search history.

(56) References Cited

U.S. PATENT DOCUMENTS

| | | | | |
|---|---|---|---|---|
| 5,110,177 A * | 5/1992 | Akio | ................. | 296/187.11 |
| 5,114,184 A * | 5/1992 | Shimomura et al. | ......... | 280/784 |
| 5,409,264 A * | 4/1995 | Nakatani | .................. | 280/834 |
| 6,893,047 B2 * | 5/2005 | Chou et al. | ................ | 280/834 |
| 6,938,948 B1 * | 9/2005 | Cornell et al. | ......... | 296/187.09 |
| 7,178,861 B2 * | 2/2007 | Yamada et al. | ............ | 296/204 |
| 2004/0075269 A1 * | 4/2004 | Chou et al. | ................ | 280/834 |
| 2005/0046170 A1 * | 3/2005 | Uhara et al. | ................ | 280/834 |
| 2005/0211486 A1 * | 9/2005 | Neely et al. | ............... | 180/69.4 |
| 2006/0066138 A1 * | 3/2006 | Okana et al. | ............... | 296/204 |
| 2006/0113784 A1 * | 6/2006 | Kishima | .................. | 280/784 |
| 2006/0175872 A1 * | 8/2006 | Wada | .................... | 296/193.07 |
| 2006/0214473 A1 * | 9/2006 | Ito et al. | ................ | 296/193.07 |
| 2007/0132223 A1 * | 6/2007 | Scheffzuek | ................ | 280/784 |
| 2007/0252412 A1 * | 11/2007 | Yatsuda | ................. | 296/193.09 |
| 2008/0315629 A1 * | 12/2008 | Abe et al. | ............. | 296/193.07 |
| 2009/0001766 A1 * | 1/2009 | Kurata | .................. | 296/203.01 |
| 2009/0001767 A1 * | 1/2009 | Yamaguchi et al. | .... | 296/203.04 |

FOREIGN PATENT DOCUMENTS

JP        2002-302071        10/2002

* cited by examiner

*Primary Examiner*—Jason S Morrow
(74) *Attorney, Agent, or Firm*—Rankin, Hill & Clark LLP (57) ABSTRACT

A floor structure for a vehicle body whereby a load transmitted to left and right floor frames is reduced, and a reduction in weight is achieved. A cross member extends between the left and right floor frames. Both ends of the cross member are inclined inward in a width direction of a vehicle toward the rear of the vehicle body; and a front portion of the cross member has a concave shape.

18 Claims, 6 Drawing Sheets

VEHICLE BODY FLOOR STRUCTURE

TECHNICAL FIELD

The present invention relates to a vehicle body floor structure wherein cross members extend between left and right floor frames and, a fuel tank is enclosed by various members.

BACKGROUND ART

A floor structure for a vehicle body in which a fuel tank is disposed below a front seat of a vehicle via a floor panel is disclosed in JP-A-2002-302071. The floor panel has a raised part that protrudes upward and is formed in a region that corresponds to a region below the front seat. The raised part increases the bending rigidity of the floor panel in a width direction of the vehicle. An accommodating concavity is formed on a rear surface side of the floor panel by the raised part. A fuel tank is accommodated in the storage concavity.

In the floor structure described above, the fuel tank is preferably enclosed by cross members and left and right floor frames for supporting the floor panel. The left and right floor frames extend in a longitudinal direction of the vehicle body, and the cross members extend between the left and right floor frames in an orthogonal fashion. For this reason, when a load is applied to the floor frame from the front of the vehicle body, the load is transmitted from the floor frame to the cross members, in which case the load is transmitted while the transmission direction undergoes a marked change.

Thus, it is difficult to transmit an impact to the cross members in a smooth fashion in the above-described floor structure. Therefore, a relatively large load is placed on the floor frame. The relatively large load placed on the floor frame must be supported by the floor frame, and the rigidity of the floor frame must be increased.

Therefore, designing the floor structure so as to increase the rigidity of the floor frame will be a factor in hampering efforts to reduce the weight of the floor structure for a vehicle body.

DISCLOSURE OF THE INVENTION

It is therefore an object of the present invention to dispense with the need to increase the rigidity of the floor frames more than is necessary, and to achieve a reduction in the weight of a floor structure for a vehicle body by efficiently transferring a load placed on the floor frames to a cross member.

According to the present invention, there is provided a floor structure for a vehicle body, which comprises: left and right floor frames extending rearwardly of the vehicle body from rear ends of left and right front side frames with a fuel tank disposed therebetween; a cross member disposed forwardly of the fuel tank and extending between the left and right floor frames, the cross member having left and right ends inclined rearwardly and transversely inwardly of the vehicle body and a front portion formed into a concave shape; and a floor panel mounted on the cross member and the left and right floor frames.

The transmission direction of the load is preferably prevented from varying significantly in order to efficiently transmit the load. In view of this, in the floor structure for a vehicle body, an end of the cross member is inclined inward in the width direction of the vehicle toward the rear of the vehicle body, and the cross member is formed into a shape substantially resembling a boomerang.

Therefore, when the floor frame is subjected to a load directed from the front of the vehicle body toward the rear, the load can be transmitted to the end of the cross member without a marked change in the transmission direction of the load. The load that acts upon the floor frame can efficiently be transmitted from the end of the cross member toward the center.

The load transmitted to the floor frames can thereby be reduced, and a reduction in the weight of the floor structure for a vehicle body can be achieved without the need to increase the rigidity of the floor frame more than necessary.

Preferably, the floor panel has cross-member-facing portions that allow attachment of inside front ends of front seats for seating vehicle occupants.

In the floor panel, the inside front end of the front seat is attached in a region that faces the cross member. Therefore, the inside front end of the front seat can be supported by the cross member, and the rigidity of the floor panel can be maintained.

A reduction in the weight of the floor structure for a vehicle body can thereby be further achieved without the need to prepare a special reinforcing member in order to maintain the rigidity of the floor panel.

Desirably, the cross member has a left end and a right end, the left end being connected to a left side sill via the left floor frame and a left side outrigger protruding from the left floor frame, the right end being connected to a right side sill via the right floor frame and a right side outrigger protruding from the right floor frame.

When the front of the floor structure for a vehicle body is subjected to a load, the acting load will accordingly be dispersed to the left and right side sills via the left and right side outriggers.

In a preferred form, the left and right floor frames are connected to a rear cross member disposed rearwardly of the fuel tank.

Accordingly, in the left floor frame, the region at the front of the region that faces the left side of the fuel tank is connected to the cross member, while the region at the rear is connected to the rear cross member. In the left floor frame, the left side of the fuel tank can thereby be protected by the region facing the left side of the fuel tank.

In the same manner, in the right floor frame, the region at the front of the region that faces the right side of the fuel tank is connected to the cross member, and the region at the rear is connected to the rear cross member. In the right floor frame, the right side of the fuel tank can thereby be protected by the region facing the right side of the fuel tank.

Preferably, the floor panel has a floor tunnel provided at a substantially lateral center of the vehicle body, extending longitudinally of the latter and projecting upwardly.

Rigidity at the center in the vehicle thickness direction can thereby be maintained even better when a load is applied to the front of the floor structure for a vehicle body.

Desirably, the floor panel has left and right upwardly raised parts which are located on left and right sides of the floor tunnel and upwardly of the fuel tank.

The space for accommodating the fuel tank can be maintained by providing the left and right raised parts to the region above the fuel tank. Therefore, the capacity of the fuel tank can be further increased.

BEST MODE FOR CARRYING OUT THE INVENTION

Preferred embodiments of the floor structure for a vehicle body of the present invention are hereunder described with reference to the attached drawings.

Figure 1:
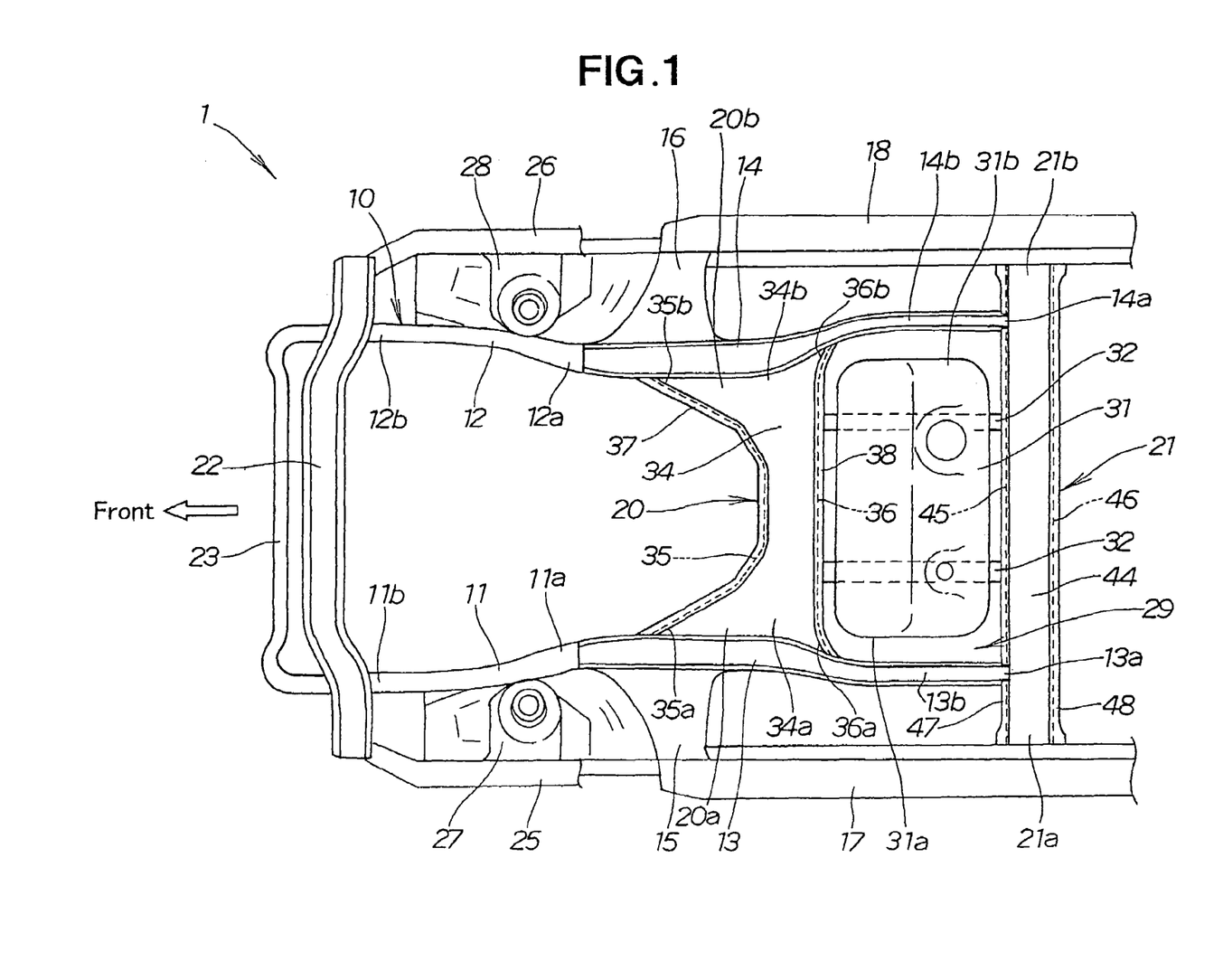
FIG. 1 is a top plan view illustrating a vehicle body floor structure according to the present invention, with a floor panel removed.

The vehicle body structure 1 shown in FIG. 1 comprises a floor structure 10 for a vehicle body; a front bulkhead 22 and front bumper beam 23 that are provided to a front end of the floor structure 10 for a vehicle body; left and right upper frames 25, 26 that extend outward from left and right ends of the front bulkhead 22 to the rear of the vehicle body along the left and right exteriors of the floor structure 10 for a vehicle body; a left wheel housing 27 provided between the left upper frame 25 and the floor structure 10 for a vehicle body; a right wheel housing 28 provided between the right upper frame 26 and floor structure 10 for a vehicle body; and a dashboard 51 (see FIG. 4) provided between the left and right wheel housings 27, 28.

The floor structure 10 for a vehicle body comprises left and right front-side frames 11, 12 that extend from both ends of the front bulkhead 22 toward the rear of the vehicle body.

Figure 3:
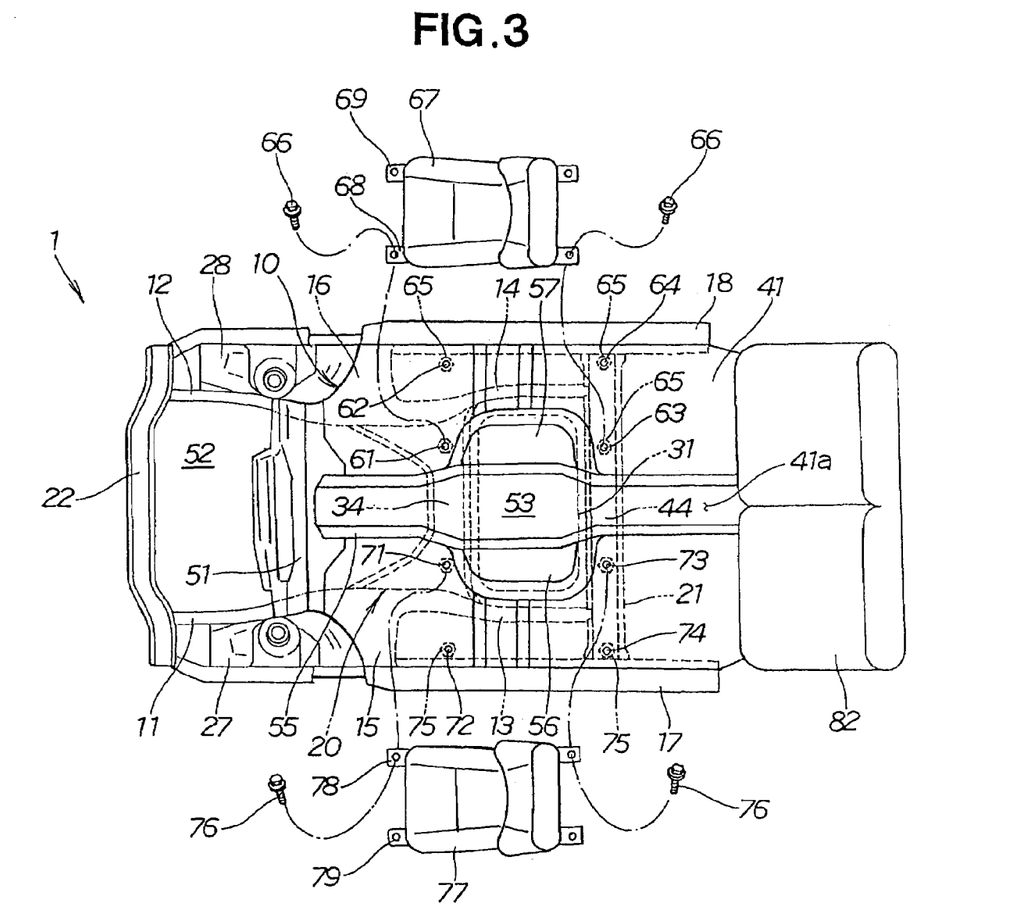
FIG. 3 is a top plan view illustrating the floor structure of FIG. 1, with the floor panel mounted.

The left and right floor frames 13, 14 extend from the rear ends 11a, 12a of the left and right front-side frames 11, 12, respectively, and toward the rear of the vehicle body. The left and right side outriggers 15, 16 protrude outwardly in the widthwise direction of the vehicle from the left and right floor frames 13, 14, respectively. The left and right side sills 17, 18 extend from external ends of the left and right side outriggers 15, 16, respectively, toward the rear of the vehicle body. The first cross member (cross member) 20 extends between the left and right floor frames 13, 14. The second cross member (rear cross member) 21 extends between the left and right side sills 17, 18 in a position to the rear of the first cross member 20. A floor panel 41 shown in FIG. 3 is mounted to the members 13, 14, 15, 16, 17, 18, 20, 21.

The members constituting the floor structure 10 for a vehicle body are described in detail hereunder.

The front bulkhead 22 and front bumper beam 23 are provided between front ends 11b, 12b of the left and right front-side frames 11, 12.

The left and right upper frames 25, 26 disposed on the outside of the left and right side frames 11, 12 are connected at the rear ends to left and right front pillars (not shown), respectively.

The left wheel housing 27 for covering a left front wheel (not shown) is disposed between the left front-side frame 11 and upper frame 25. The right wheel housing 28 for covering a right front wheel (not shown) is disposed between the right front-side frame 12 and right upper frame 26.

The fuel tank 31 is supported by a pair of supporting belts 32, 32 in a space 29 formed between the left and right floor frames 13, 14 and between the first and second cross members 20, 21. In other words, the first cross member 20 is disposed in front of the fuel tank 31 while the fuel tank 31 is enclosed by the left and right floor frames 13, 14, the first cross member 20, and the second cross member 21.

Figure 5:
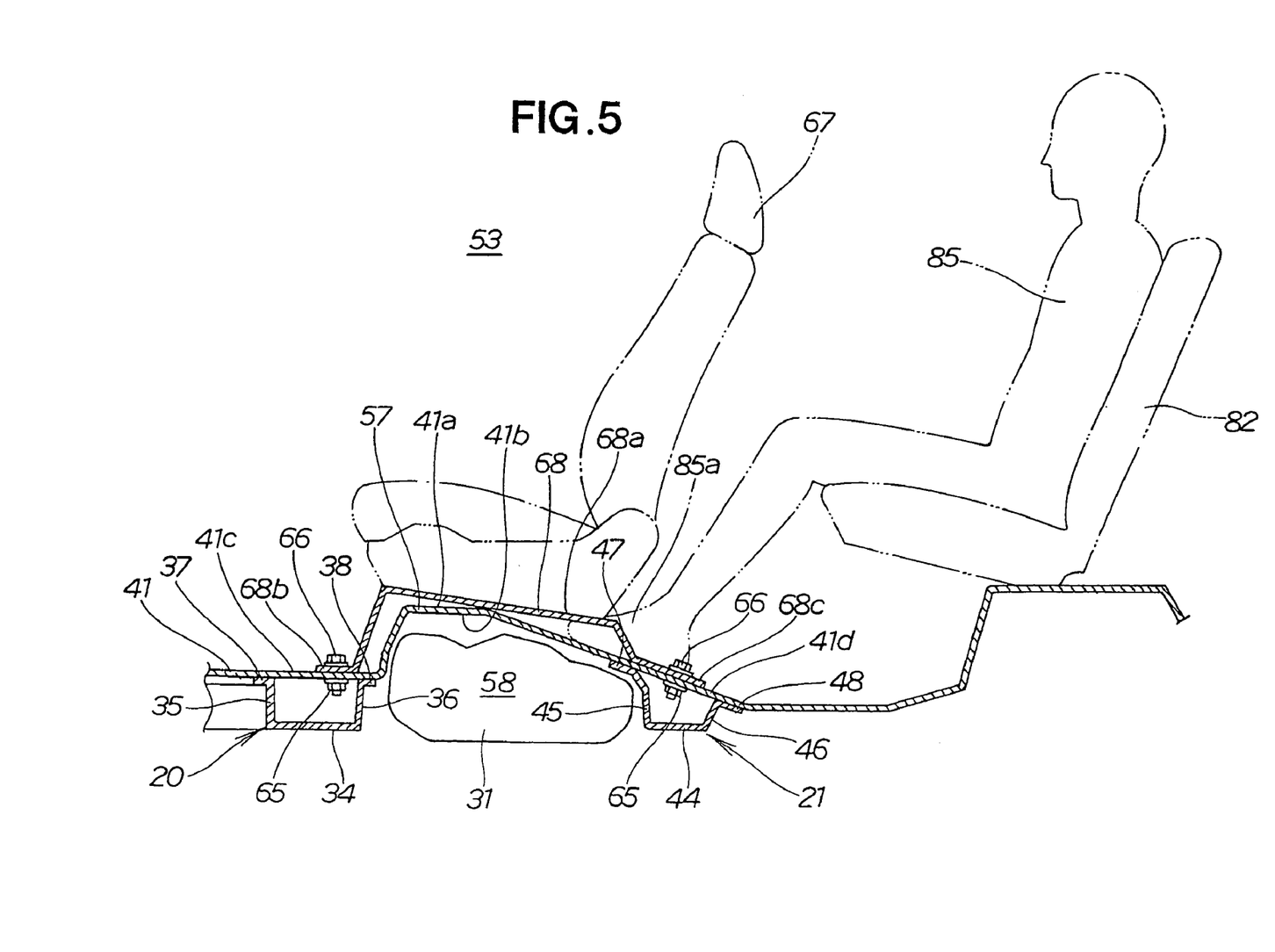
FIG. 5 is a cross-sectional view taken along line 5-5 of FIG. 4.

The first cross member 20 is formed using a bottom 34 and front and rear walls 35, 36, and has a shape whose cross section is substantially U-shaped (see FIG. 5). The top part of the front wall 35 has a front overhanging piece 37 that hangs facing the front of the vehicle body, as shown in FIG. 5. The top part of the rear wall 36 has a rear overhanging piece 38 that hangs facing the rear of the vehicle body. The floor panel 41 is mounted to the front and rear overhanging pieces 37, 38 by spot welding or another technique.

Left and right ends 20a, 20b of the first cross member 20 are mounted to the left and right floor frames 13, 14, respectively. Specifically, left and right ends 34a, 34b of the bottom 34 are mounted to bottoms of the left and right floor frames 13, 14 by spot welding or another technique. Left and right ends 35a, 35b of the front wall 35 are mounted to inside walls of the left and right floor frames 13, 14, respectively, by spot welding or another technique. Left and right ends 36a, 36b of the rear wall 36 are mounted to the inside walls of the left and right floor frames 13, 14, respectively, by spot welding or another technique.

The left end 20a of the first cross member 20 is connected to the left side sill 17 via the left floor frame 13 and the left side outrigger 15. The right end 20b of the first cross member 20 is connected to the right side sill 18 via the right floor frame 14 and right side outrigger 16.

The second cross member 21 that is placed to the rear of the fuel tank 31 extends between the left and right side sills 17, 18 in an orthogonal fashion. Left and right ends 21a, 21b are mounted to the left and right side sills 17, 18, respectively.

Rear ends 13a, 14a of the left and right floor frames 13, 14 are each connected to the second cross member 21.

A front-side part of a left region 13b of the floor frame 13 that faces a left side part 31a of the fuel tank 31 is connected to the left end 20a of the first cross member 20, while a front-side part of the left region 13b is connected to the left end 21a of the second cross member 21. Therefore, the left side part 31a of the fuel tank 31 is protected by the left region 13b of the left floor frame 13.

In the same manner, a front-side part of a right region 14b of the floor frame 14 that faces a right side part 31b of the fuel tank 31 is connected to the right end 20b of the first cross member 20, while a front-side part of the right region 14b is connected to the right end 21b of the second cross member 21; and the right side part 31b of the fuel tank 31 is accordingly protected by the right region 14b of the right floor frame 14.

The second cross member 21 is formed from a bottom 44 and front and rear walls 45, 46, and has a shape whose cross section is substantially U-shaped (see FIG. 5). The top part of the front wall 45 has a front overhanging piece 47 that hangs facing the front of the vehicle body, as shown in FIG. 5. The top part of the rear wall 46 has a rear overhanging piece 48 that hangs facing the rear of the vehicle body. The panel 41 is mounted to the front and rear overhanging parts 47, 48 by spot welding or another technique.

Figure 2:
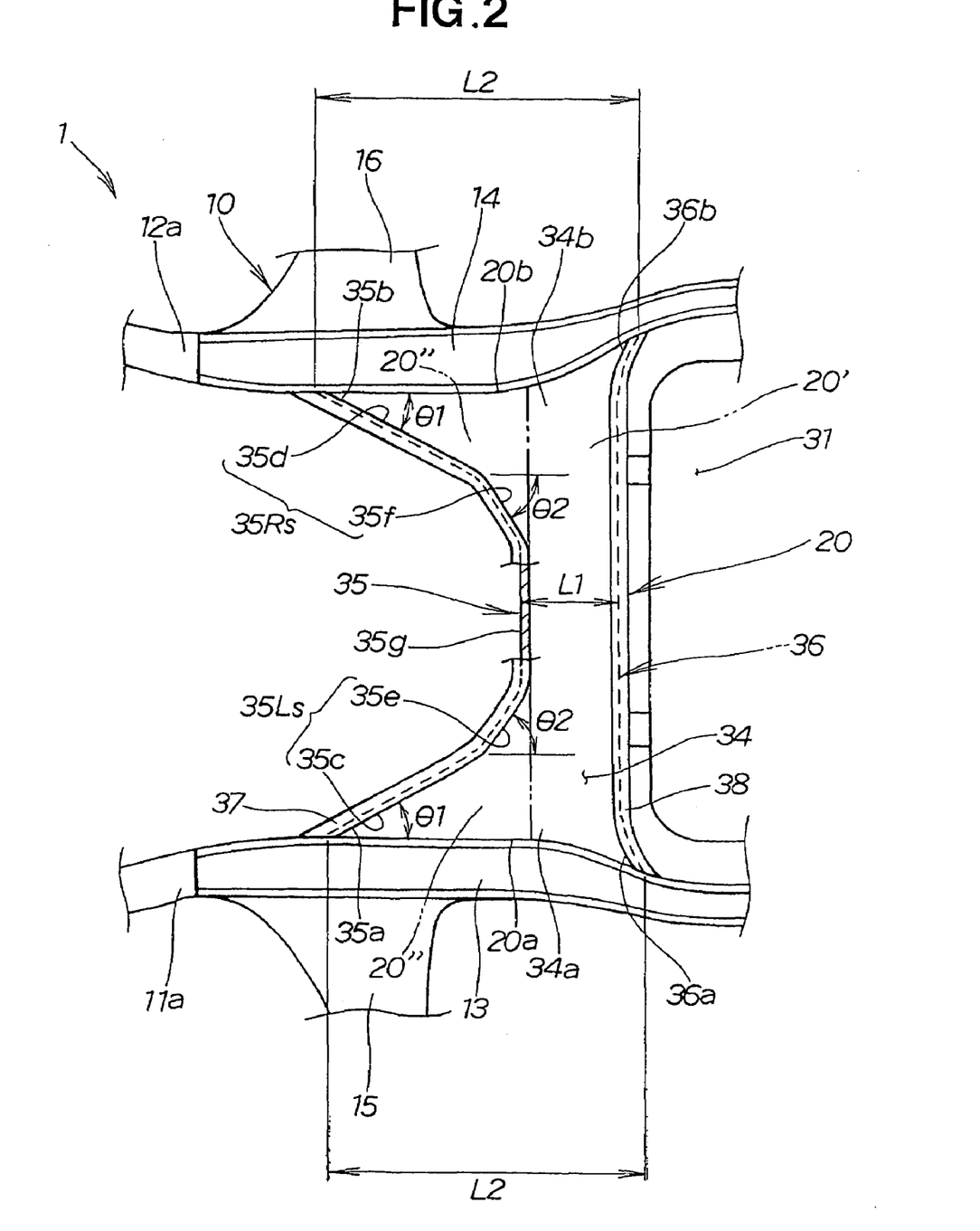
FIG. 2 is a top plan view illustrating a first cross member shown in FIG. 1.

The front wall 35 of the first cross member 20 is formed into a shape substantially resembling a boomerang by a left front wall end (left end) 35Ls of the front wall 35, a right front wall end (right end) 35Rs of the front wall 35, and a central part (hereinbelow referred to as "horizontal region") 35g provided between the left and right front wall ends 35LS, 35Rs, as shown in FIG. 2. In other words, the first cross member 20 has a concavity formed so that the front portion opens facing forward.

The left front wall end 35Ls is composed of a left external inclined region 35c and a left internal inclined region 35e. The right front wall end 35Rs is composed of a right external inclined region 35d and a right internal inclined region 35f.

Specifically, the left external inclined region 35c inclines inward at an angle of θ1 in the width direction of the vehicle with respect to the left floor frame 13. The right external inclined region 35d inclines inward at an angle of θ1 in the width direction of the vehicle with respect to the right floor frame 14.

The left internal inclined region 35e is inclined at an angle θ2 with respect to the left floor frame 13. The right internal inclined region 35f is inclined at an angle θ2 with respect to the right floor frame 14. The relationship between the angle of incline θ1 and the angle of incline θ2 is θ1<θ2.

The left and right internal inclined regions 35e, 35f extend to the horizontal region 35g. The left and right front wall ends 35Ls, 35Rs extend to the horizontal region 35g. The horizontal region 35g is a region that extends so as to be substantially orthogonal to the longitudinal direction of the vehicle body; i.e., extends along the width direction of the vehicle.

The front wall 35 of the first cross member 20 is thus formed into a shape substantially resembling a boomerang so as to have a concave form facing the rear of the vehicle body.

Conversely, the rear wall 36 is a wall having a linear shape, which extends orthogonally between the left and right floor frames 13, 14, and extends along the widthwise direction of the vehicle.

Thus, the left front wall end 35Ls of the front wall 35 (left external inclined region 35c and left internal inclined region 35e) is inclined inward in the width direction of the vehicle toward the rear of the vehicle body while the right front wall end 35Rs of the front wall 35 (right external inclined region 35d and right internal inclined region 35f) is inclined inward in the width direction of the vehicle toward the rear of the vehicle body, thereby forming the first cross member 20 into a shape substantially resembling a boomerang.

The left front wall end 35Ls constitutes a portion of the left end 20a of the first cross member 20. In addition, the right front wall end 35Rs constitutes a portion of the right end 20b of the first cross member 20.

Accordingly, the left end 20a is inclined inward in the width direction of the vehicle toward the rear of the vehicle body while the right end 20b is inclined inward in the width direction of the vehicle toward the rear of the vehicle body, whereby the first cross member 20 is formed into a shape substantially resembling a boomerang.

Figure 6:
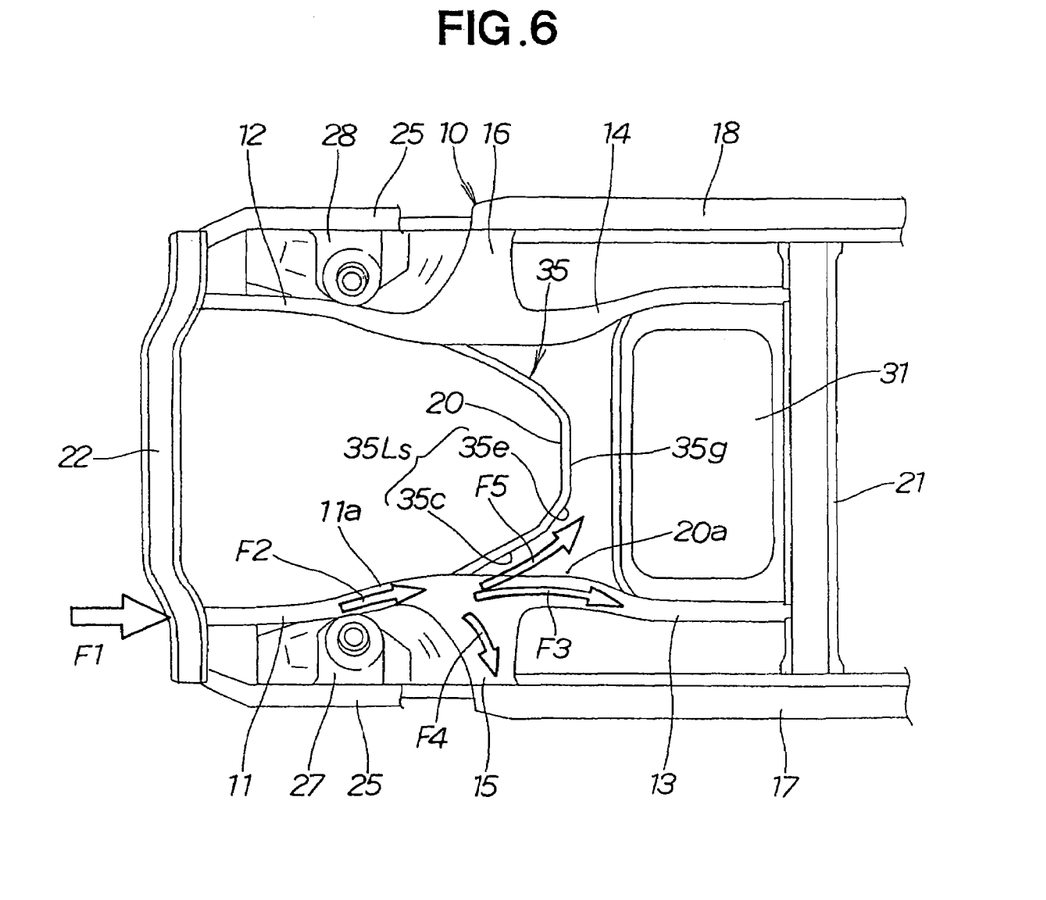
FIG. 6 is a schematic view illustrating how a load applied from the front on the floor structure of the present invention is dispersed.

The reason for forming the first cross member 20 into a shape substantially resembling a boomerang shall be explained in detail using FIG. 6.

The distance from the central part of the rear wall 36 to the horizontal region (i.e., the central region) 35g of the front wall 35 is L1.

The distance from the left end 36a of the rear wall 36 to the left end 35a of the front wall 35 is L2. The distance from the right end 36b of the rear wall 36 to the right end 35b of the front wall 35 is L2.

A relationship of L2>L1 can be established between the distance L2 and the distance L1 by forming the front wall 35 into a shape substantially resembling a boomerang.

The distance L2 is set to be greater than the distance L1, whereby the left end 20a of the first cross member 20 that is connected to the left floor member 13 can be firmly secured. Accordingly, the left end 20a of the first cross member 20 can be securely connected to the left floor frame 13.

Similarly, the distance L2 is set to be greater than the distance L1, whereby the right end 20b of the first cross member 20 that is connected to the right cross frame 14 can be firmly secured. The right end 20b of the first cross member 20 can thereby be securely connected to the right floor frame 14.

The rigidity of the first cross member 20 can thereby be increased.

The abovementioned configuration of the first cross member 20 can alternatively be described as follows. The first cross member 20 is composed of a linear cross member main body 20' and energy-transmitting parts 200", 20", each of which substantially have the shape of a right triangle, at the front parts of both ends of the cross member main body 20', as indicated by the two-dot dashed line in FIG. 2.

The triangular energy-transmitting parts 20" are formed integrally with the cross member main body 20" so that the inclined sides are directed inward in the width direction of the vehicle. For this reason, the first cross member 20 has a concave shape that opens at the front. Therefore, compared to a cross member structure in which the cross member main body and the energy-transmitting parts are formed as separate elements, the number of component parts is smaller and the assembling process is simpler even though the same function is demonstrated for allowing energy transmitted from the front side frame to be transmitted quickly to the cross member main body. In addition, the members are integrally formed. In addition, the members are integrally formed, thereby providing a benefit in terms of greater strength than in a structure in which the members are formed separately.

Figure 4:
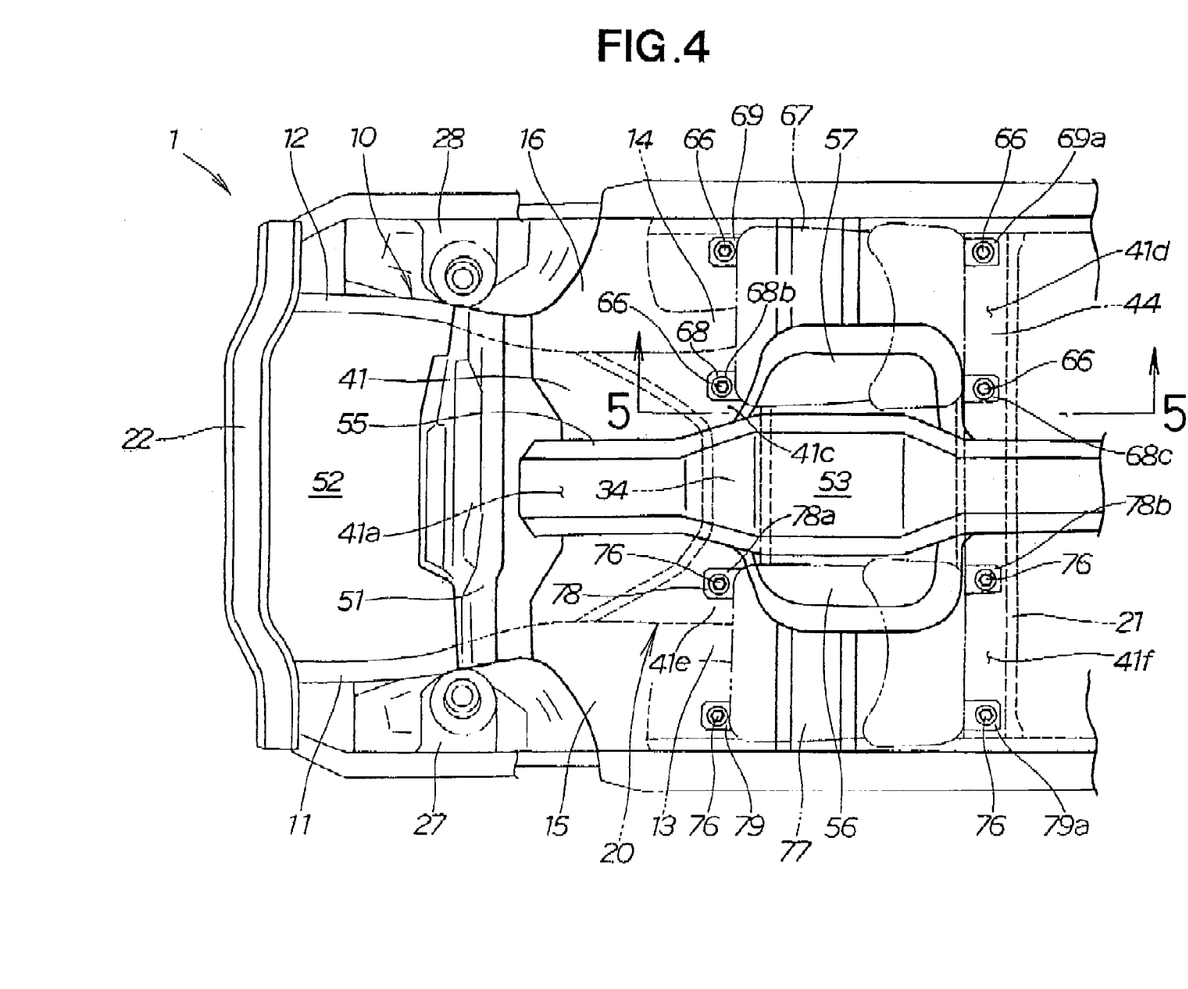
FIG. 4 is a top plan view illustrating the floor structure of FIG. 3, with front seats attached.

The floor panel 41 shown in FIGS. 3 and 4 is formed into a substantially rectangular shape and is mounted to the left and right side sills 17, 18; the left and right side outriggers 15, 16; the left and right floor frames 13, 14; and the first and second cross members 20, 21 by spot welding or another technique.

A dashboard 51 is mounted to a front end of the floor panel 41. An engine room 52 and vehicle interior 53 (see also FIG. 5) are separated by the dashboard 51.

A floor tunnel 55 that extends in the longitudinal direction of the vehicle body is formed in the floor panel 41 in the central part of the width direction of the vehicle, and left and right raised parts 56, 57 that bulge upward from the floor tunnel 55 to the left and right sides are formed.

The left and right raised parts 56, 57 are each disposed between the first and second cross members 20, 21.

The floor tunnel 55 projects or bulges toward the vehicle interior 53 (i.e., upward), whereby a surface 41a of the floor panel 41 is formed into a shape that is substantially convex in cross-section and whereby a reverse surface of the floor panel 41 is formed into a shape that is substantially concave in cross-section.

The left and right raised parts 56, 57 become larger toward the vehicle interior 53 (i.e., upward), whereby a surface 41a of the floor panel 41 is formed into a shape that is substantially convex in cross-section and whereby a reverse surface 41b (see FIG. 5) of the floor panel 41 is formed into a shape that is substantially concave in cross-section.

An accommodating space 58 (see FIG. 5) is accordingly formed on the reverse surface 41b of the floor panel 41 by the left and right raised parts 56, 57 and by the floor tunnel 55 that is between the left and right raised parts 56, 57.

The fuel tank 31 can be given a further increase in capacity by being placed in this accommodating space 58.

When a load is applied to the front of the floor structure 10 for a vehicle body, the rigidity of the center in the width direction of the vehicle can be secured more favorably by forming the floor tunnel 55.

In the floor panel 41, right internal and external front mounting holes 61, 62 and right internal and external rear mounting holes 63, 64 are formed on the right side of the floor tunnel 55.

Nuts 65 are disposed coaxially with respect to the right internal and external front mounting holes 61, 62 and the right internal and external rear mounting holes 63, 64; and the nuts 65 are welded to the reverse surface 41*b* (see FIG. 5) of the floor panel 41.

The right internal front mounting hole 61 is formed in a region that faces the bottom 34 of the first cross member 20 (see also FIG. 5).

The right internal and external rear mounting holes 63, 64 are each formed in regions that face the bottom 44 of the second cross member 21 (see also FIG. 5).

A driver's seat (front seat) 67 is mounted to the right internal and external front mounting holes 61, 62 and right internal and external rear mounting holes 63, 64.

The driver's seat 67 comprises, for example, internal and external mounting brackets 68, 69. A bolt 66 is inserted into a front mounting hole of the internal mounting bracket 68 and the right internal front mounting hole 61 of the floor panel 41, and fastened with a nut 65.

A bolt 66 is inserted into a rear mounting hole of the internal mounting bracket 68 and the right internal rear mounting hole 63 of the floor panel 41, and fastened with a nut 65.

A bolt 66 is inserted into a front mounting hole of the external mounting bracket 69 and the right external front mounting hole 62 of the floor panel 41, and fastened with a nut 65.

A bolt 66 is inserted into a rear mounting hole of the external mounting bracket 69 and the right external rear mounting hole 64 of the floor panel 41, and fastened with a nut 65.

The driver's seat 67 is accordingly mounted (fastened) by nuts 65 and bolts 66 to the right internal and external front mounting holes 61, 62 and the right internal and external rear mounting holes 63, 64 formed on the floor panel 41.

Left internal and external front mounting holes 71, 72 and left internal and external rear mounting holes 73, 74 are further formed on the left side of the floor tunnel 55 in the floor panel 41.

Nuts 75 are each disposed coaxially with respect to the left internal and external front mounting holes 71, 72 and left internal and external rear mounting holes 73, 74; and the nuts 75 are welded to the reverse surface 41*b* of the floor panel 41.

The left internal front mounting hole 71 is formed in a region that faces the bottom 34 of the first cross member 20 in the same manner as the right internal front mounting hole 61.

The left internal and external rear mounting holes 73, 74 are each formed in regions that face the bottom 44 of the second cross member 21 in the same manner as the right internal and external rear mounting holes 63, 64.

A front passenger's seat (front seat) 77 is mounted to the left internal and external front mounting holes 71, 72 and left internal and external rear mounting holes 73, 74.

The front passenger's seat 77 comprises, for example, internal and external mounting brackets 78, 79. A bolt 76 is inserted into a front mounting hole of the internal mounting bracket 78 and the left internal front mounting hole 71 of the floor panel 41, and fastened by a nut 75. A bolt 76 is inserted into a rear mounting hole of the internal mounting bracket 78 and the left internal rear mounting hole 73 of the floor panel 41, and fastened by a nut 75.

A bolt 76 is inserted into a front mounting hole of the external mounting bracket 79 and the left external front mounting hole 72 of the floor panel 41, and fastened by the nut 75. A bolt 76 is inserted into a rear mounting hole of the external mounting bracket 79 and the left external rear mounting hole 74 of the floor panel 41, and fastened by the nut 75.

The front passenger's seat 77 is accordingly mounted (fastened) by bolts 76 and nuts 75 to the left internal and external front mounting holes 71, 72 and the left internal and external rear mounting holes 73, 74 formed on the floor panel 41.

A rear seat 82 is provided to the rear of the driver's seat 67 and the front passenger's seat 77, which are mounted to the floor panel 41.

A central part 68*a* of the internal mounting bracket 68 for supporting the driver's seat 67 is formed so as to be elevated on the side of the vehicle interior 53, as shown in FIG. 5.

A front end (inside front end) 68*b* of the internal mounting bracket 68 is mounted (fastened) by a nut 65 and a bolt 66 to a region within the floor panel 41 that faces the bottom 34 of the first cross member 20.

A rear end 68*c* of the internal mounting bracket 68 is mounted (fastened) by a nut 65 and a bolt 66 to a region within the floor panel 41 that faces the bottom 44 of the second cross member 21.

A member similar to the internal mounting bracket 68 can be used as the external mounting bracket 69 (see FIG. 3) for supporting the driver's seat 67 and as the internal and external mounting brackets 78, 79 (see FIG. 3) for supporting the front passenger's seat 77.

A detailed description of the external mounting bracket 69 and the internal and external mounting brackets 78, 79 shall accordingly be omitted.

As has been described above, the driver's seat 67 is mounted to the floor panel 41 by the internal and external mounting brackets 68, 69. A rear seat 82 is provided to the rear of the driver's seat 67.

A vehicle occupant 85 in the rear seat 82 can keep their legs 85*a* in a comfortable position by resting the legs 85*a* on the right raised part 57, as shown in FIG. 5.

The driver's seat 67 and front passenger's seat 77 (see FIG. 3) comprise, for example, a slide mechanism or another seat adjustment mechanism.

As has been described above, the front end (inside front end) 68*b* of the internal mounting bracket 68 provided to the driver's seat 67 is fastened by a nut 65 and a bolt 66 to the region 41*c* within the floor panel 41 that faces the bottom 34 of the first cross member 20.

Therefore, the region 41*c* where the front end 68*b* is attached can be supported by the first cross member 20, and the rigidity of the floor panel 41 can be maintained.

A special reinforcing member can accordingly be rendered unnecessary for maintaining the rigidity of the floor panel 41.

The rear end 68*c* of the internal mounting bracket 68 provided to the driver's seat 67 is fastened by a nut 65 and a bolt 66 to the region 41*d* within the floor panel 41 that faces the bottom 44 of the second cross member 21.

In addition, the rear end 69*a* of the external mounting bracket 69 provided to the driver's seat 67 is fastened by a nut 65 and a bolt 66 to the region 41*d* within the floor panel 41 that faces the bottom 44 of the second cross member 21, as shown in FIG. 4.

Therefore, the region 41*d* where the rear ends 68*c*, 69*a* are attached can be supported by the second cross member 21, and the rigidity of the floor panel 41 can be maintained.

A special reinforcing member can thereby be rendered unnecessary for maintaining the rigidity of the floor panel 41.

Thus, the rigidity of the region within the floor panel 41 where the driver's seat 67 is mounted can be ensured via the first and second cross members 20, 21.

The rigidity of the region within the floor panel 41 where the front passenger's seat 77 is mounted shall next be described with reference being made once more to FIG. 4.

The front end (inside front end) 78a of the internal mounting bracket 78 provided to the front passenger's seat 77 is fastened by a nut 75 and a bolt 76 (see FIG. 3) to a region 41e within the floor panel 41 that faces the bottom 34 of the first cross member 20.

Therefore, the region 41e where the front end 78a is attached can be supported by the first cross member 20, and the rigidity of the floor panel 41 can be maintained.

A special reinforcing member can thereby be rendered unnecessary for maintaining the rigidity of the floor panel 41.

The rear end 78b of the internal mounting bracket 78 provided to the front passenger's seat 77 is mounted by a nut 75 and a bolt 76 (see FIG. 3) to a region 41f within the floor panel 41 that faces the bottom 44 of the second cross member 21.

In addition, the rear end 79a of the external mounting bracket 79 provided to the front passenger's seat 77 is mounted by a nut 75 and a bolt 76 (see FIG. 3) to the region 41f within the floor panel 41 that faces the bottom 44 of the second cross member 21.

Therefore, the region 41f where the rear ends 78b, 79a are attached can be supported by the second cross member 21, and the rigidity of the floor panel 41 can be maintained.

A special reinforcing member can thereby be rendered unnecessary for maintaining the rigidity of the floor panel 41.

The rigidity of the region within the floor panel 41 where the front passenger's seat 77 is mounted can thus be secured via the first and second cross members 20, 21.

An example in which a load is applied from the front to the floor structure 10 for a vehicle body shall next be described with reference being made to FIG. 6.

The floor structure 10 for a vehicle body has a bilaterally symmetrical structure. Accordingly, in FIG. 6, an example is described in which a load is applied to the left side of the floor structure 10 for a vehicle body, and a description of an example in which a load is applied to the right side of the floor structure 10 for a vehicle body shall be omitted.

When a load F1 is applied to the front of the left side of the floor structure 10 for a vehicle body as indicated by the arrow, the load F1 is transmitted as a load F2 to the left front-side frame 11.

The load F2 transmitted to the left front-side frame 11 is transmitted as a load F3 to the left floor frame 13 in the rear end 11a of the left front-side frame 11 while a load F4 is transmitted to the left side outrigger 15 and the load F5 is transmitted to the first cross member 20.

A portion of the load F2 transmitted to the left front-side frame 11 is transmitted as the load F5 to the left end 20a of the first cross member 20 along the left front wall end 35Ls (left external inclined region 35c).

The front wall 35 of the first cross member 20 is formed into a shape substantially resembling a boomerang by inclining the left front wall end 35Ls inward in the width direction of the vehicle and facing the rear of the vehicle body all the way to the horizontal region (middle region) 35g of the first cross member 20.

With the left front wall end 35Ls thus inclined, a portion of the load F2 transmitted to the left front-side frame 11 is accordingly transmitted as the load F5 to the left end 20a of the first cross member 20 without a marked change in the transmission direction.

Furthermore, the load F5 transmitted to the left front wall end 35Ls is transmitted to the horizontal region 35g via the left internal inclined region 35e due to the fact that the left front wall end 35Ls extends to the horizontal region 35g.

The angle of incline θ2 of the left internal inclined region 35e is set to be greater than the angle of incline θ1 of the left external inclined region 35c, as shown in FIG. 2.

The load F5 transmitted to the left internal inclined region 35e is therefore efficiently transmitted (dispersed) to the horizontal region 35g of the first cross member 20 without a marked change in the transmission direction.

Conversely, the load F4 transmitted to the left side outrigger 15 is dispersed to the left side sill 17 via the left side outrigger 15.

The load F3 transmitted to the left floor frame 13 can accordingly be reduced, and the rigidity of the left floor frame 13 need not be increased more than necessary. A reduction in the weight of the floor structure 10 for a vehicle body can thus be achieved by reducing the load F3 transmitted to the left floor frame 13.

As described above, the front wall 35 of the first cross member 20 is formed into a shape substantially resembling a boomerang, whereby the left end 20a of the first cross member 20, which is connected to the left floor frame 13, can be firmly secured.

The left end 20a of the first cross member 20 can therefore be securely connected to the left floor frame 13.

The rigidity of the first cross member 20 can accordingly be increased. Therefore, the load F5 transmitted from the left front-side frame 11 can adequately be received by the first cross member 20.

In the above embodiment, an example was described in which the front wall 35 of the first cross member 20 is formed into a concave form substantially having the shape of a boomerang by the left and right external inclined regions 35c, 35d, the left and right internal inclined regions 35e, 35f, and the horizontal region 35g. However, the configuration is not limited thereto, and the same effect can also be obtained when the front wall 35 is formed into a curved shape, a wide arrowhead shape, or another form.

In short, the front wall 35 may be formed into a concave form substantially having the shape of a boomerang.

In addition, in the above embodiment, an example was described in which the front wall 35 is formed into a shape substantially resembling a boomerang, and the rear wall 36 is formed into a linear shape within the first cross member 20. However, the configuration is not limited thereto, and the rear wall 36 can be formed into a shape substantially resembling a boomerang in the same manner as the front wall 35.

Furthermore, in the above embodiment, an example was described of a first cross member 20 as a member formed from a bottom 34 and front and rear walls 35, 36 into a shape whose cross-section substantially resembles a square that is open on the top side. However, the shape of the first cross member 20 is not limited thereto.

For example, the first cross member 20 can be a member whose cross-section substantially resembles a square that is open on the bottom side, formed by a top part and front and rear walls; or a member having a closed cross section.

Still further, bolts 66, 76 and nuts 65, 75 were given in the above embodiment as examples of fastening members for fastening the driver's seat 67 and front passenger's seat 77 to the floor panel 41. However, clips or other fastening members can also be used.

Further still, an example was described in the above embodiment in which internal and external mounting brackets 68, 69 are used as members for mounting the driver's seat 67 to the floor panel 41, and internal and external mounting brackets 78, 79 are used as members for mounting the front passenger's seat 77 to the floor panel 41. However, the configuration is not limited thereto, and other members can also be used.

The driver's seat 67 and front passenger's seat 77 can also be directly mounted to the floor panel 41.

INDUSTRIAL APPLICABILITY

The present invention can be used in automobiles configured so that cross members extend between left and right floor frames, and a fuel tank is enclosed by various members.

The invention claimed is:

1. A floor structure for a vehicle body, comprising:
   left and right floor frames extending rearwardly of the vehicle body from rear ends of left and right front side frames with a fuel tank disposed therebetween;
   a cross member disposed forwardly of the fuel tank and extending between the left and right floor frames, the cross member having a concave shaped front portion opposed to a rear portion that is disposed adjacent to the fuel tank, the front portion having inclined left and right ends that are contiguous with the left and right floor frames, the inclined left and right ends being inclined rearwardly and transversely inwardly of the vehicle body; and
   a floor panel mounted on the cross member and the left and right floor frames.

2. A floor structure for a vehicle body, comprising:
   left and right floor frames extending rearwardly of the vehicle body from rear ends of left and right front side frames with a fuel tank disposed therebetween;
   a cross member disposed forwardly of the fuel tank and extending between the left and right floor frames, the cross member having left and right ends inclined rearwardly and transversely inwardly of the vehicle body and a front portion formed into a concave shape; and
   a floor panel mounted on the cross member and the left and right floor frames,
   wherein the floor panel has cross-member-facing portions that allow attachment of inside front ends of front seats for seating vehicle occupants.

3. The floor structure of claim 1, wherein the cross member left end is connected to a left side sill via the left floor frame and a left side outrigger protruding from the left floor frame, and the cross member right end is connected to a right side sill via the right floor frame and a right side outrigger protruding from the right floor frame.

4. The floor structure of claim 1, wherein the left and right floor frames are connected to a rear cross member disposed rearwardly of the fuel tank.

5. The floor structure of claim 1, wherein the floor panel has a floor tunnel provided at a substantially lateral center of the vehicle body, wherein said floor tunnel extends longitudinally along the vehicle body and projects upwardly.

6. The floor structure of claim 5, wherein the floor panel has left and right upwardly raised parts which are located on left and right sides of the floor tunnel and above the fuel tank.

7. The floor structure of claim 3, wherein the left and right floor frames are connected to a rear cross member disposed rearwardly of the fuel tank.

8. The floor structure according to claim 3, wherein the left and right side sills are disposed outward from the left and right floor frames.

9. The floor structure according to claim 8, wherein a second cross member is disposed rearwardly of the fuel tank and extends between the left and right side sills, wherein rear ends of the left and right floor frames are connected to the second cross member.

10. The floor structure according to claim 9, wherein the floor panel is also mounted on the second cross member and the left and right side sills.

11. The floor structure according to claim 6, wherein the floor tunnel and the left and right upwardly raised parts define a fuel tank accommodating space.

12. A floor structure for a vehicle body, comprising:
    left and right floor frames extending rearwardly of the vehicle body from rear ends of left and right front side frames with a fuel tank disposed therebetween;
    a cross member disposed forwardly of the fuel tank and extending between inner sides of the left and right floor frames, the cross member having left and right ends inclined rearwardly and transversely inwardly of the vehicle body and a front portion formed into a concave shape;
    left and right side outriggers extending outwardly from outer sides of the left and right floor frames at a longitudinal position that substantially corresponds to that of the cross member, the left and right side outriggers being inclined rearwardly and transversely outwardly of the vehicle body, and
    a floor panel mounted on the cross member and the left and right floor frames.

13. The floor structure according to claim 12, further comprising left and right side sills disposed laterally outwardly of the left and right floor frames, wherein
    the left side sill is connected to a left side of the cross member via the left floor frame and the left side outrigger, and
    the right side sill is connected to a right side of the cross member via the right floor frame and the right side outrigger.

14. The floor structure according to claim 13, further comprising a rear cross member disposed rearwardly of the fuel tank and extending between the left and right side sills.

15. The floor structure according to claim 14, wherein rear ends of the left and right floor frames are connected to the rear cross member.

16. The floor structure according to claim 13, wherein the floor panel is also mounted on the left and right side outriggers and the left and right side sills.

17. The floor structure according to claim 14, wherein the floor panel is also mounted on the left and right side outriggers, the left and right side sills, and the rear cross member.

18. The floor structure according to claim 15, wherein the floor panel is also mounted on the left and right side outriggers, the left and right side sills, and the rear cross member.

* * * * *